United States Patent
Shimose

(10) Patent No.: US 8,555,110 B2
(45) Date of Patent: Oct. 8, 2013

(54) APPARATUS, METHOD, AND PROGRAM CONFIGURED TO EMBED A STANDBY UNIT BASED ON AN ABNORMALITY OF AN ACTIVE UNIT

(75) Inventor: Eiji Shimose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/111,372

(22) Filed: May 19, 2011

(65) Prior Publication Data

US 2011/0219264 A1 Sep. 8, 2011

Related U.S. Application Data

(63) Continuation of application No. PCT/JP2008/071514, filed on Nov. 27, 2008.

(51) Int. Cl.
*G06F 11/00* (2006.01)

(52) U.S. Cl.
USPC ................... 714/13; 714/6.3; 714/41

(58) Field of Classification Search
USPC .................. 714/4.11, 6.3, 11, 13, 36, 41, 42
See application file for complete search history.

(56) References Cited

U.S. PATENT DOCUMENTS

| | | | | |
|---|---|---|---|---|
| 7,107,493 | B2 * | 9/2006 | Nguyen et al. | 714/42 |
| 7,788,517 | B2 | 8/2010 | Tanaka | |
| 7,895,428 | B2 * | 2/2011 | Boland et al. | 713/2 |
| 2007/0011495 | A1 | 1/2007 | Armstrong et al. | |
| 2007/0101191 | A1 | 5/2007 | Iwama | |
| 2008/0133963 | A1 | 6/2008 | Katano et al. | |
| 2009/0292897 | A1 | 11/2009 | Koinuma | |
| 2010/0107010 | A1* | 4/2010 | Warnes et al. | 714/36 |

FOREIGN PATENT DOCUMENTS

| | | |
|---|---|---|
| JP | 5-303509 | 11/1993 |
| JP | 8-87426 | 4/1996 |
| JP | 9-160682 | 6/1997 |
| JP | 3103236 | 8/2000 |
| JP | 3402733 | 2/2003 |
| JP | 2006-252429 | 9/2006 |
| JP | 2006-268521 | 10/2006 |
| JP | 2006-277210 | 10/2006 |
| JP | 4061549 | 1/2008 |
| WO | 2008/099453 A1 | 8/2008 |

OTHER PUBLICATIONS

Japanese Office Action mailed Dec. 4, 2012 issued in corresponding Japanese Patent Application No. 2010-540253.
Extended European Search Report mailed Apr. 18, 2013 for corresponding European Application No. 08878403.8.

* cited by examiner

*Primary Examiner* — Scott Baderman
*Assistant Examiner* — Joseph Kudirka
(74) *Attorney, Agent, or Firm* — Staas & Halsey LLP

(57) ABSTRACT

An information processing apparatus includes active units and a standby unit. In the active units and the standby unit, CPUs and DIMMs are divided into a plurality of logical partitions, which are controlled to be diagnosed respectively by diagnosing units. A scheduling unit periodically diagnoses the CPUs and the DIMMs of the standby unit in each of the partitions in turn. If a fault occurs on the active units side, a switching controlling unit controls a partition not being diagnosed in the standby unit to be embedded in an active unit system of the information processing apparatus. The scheduling unit instructs a diagnosis with a smaller number of diagnosis items as a diagnosis performed at reboot after the standby unit is embedded.

4 Claims, 13 Drawing Sheets

| ITEM NO. | ITEM | | NORMAL DIAGNOSIS | DIAGNOSIS AT EMBEDDING |
|---|---|---|---|---|
| 1 | CPU | WRITE TO L3 CACHE MEMORY ADDRESS A TEST PATTERN A (ALL BYTES 0xaa) | ● | ● |
| 2 | CPU | WRITE TO L3 CACHE MEMORY ADDRESS A TEST PATTERN B (ALL BYTES 0x55) | ● | — |
| 3 | CPU | WRITE TO L3 CACHE MEMORY ADDRESS A TEST PATTERN C (ALL BYTES 0x00) | ● | — |
| 4 | CPU | WRITE TO L3 CACHE MEMORY ADDRESS A TEST PATTERN D (ALL BYTES 0xff) | ● | — |
| 5 | CPU | WRITE TO L2 CACHE MEMORY ADDRESS A TEST PATTERN A (ALL BYTES 0xaa) | ● | ● |
| 6 | CPU | WRITE TO L3 CACHE MEMORY ADDRESS A TEST PATTERN B (ALL BYTES 0x55) | ● | — |
| 7 | | | | |
| ⋮ | ⋮ | ⋮ | ⋮ | ⋮ |
| | DIMM | WRITE TO MEMORY ADDRESS A TEST PATTERN A (ALL BYTES 0xaa) | ● | ● |
| | DIMM | WRITE TO MEMORY ADDRESS A TEST PATTERN B (ALL BYTES 0x55) | ● | — |
| | DIMM | WRITE TO MEMORY ADDRESS A TEST PATTERN C (ALL BYTES 0x00) | ● | — |
| | DIMM | WRITE TO MEMORY ADDRESS A TEST PATTERN D (ALL BYTES 0xff) | ● | — |
| ⋮ | ⋮ | ⋮ | ⋮ | ⋮ |
| N | DIMM | WRITE TO MEMORY ADDRESS X TEST PATTERN D (ALL BYTES 0xff) | ● | — |

● : TARGET
— : NON-TARGET

F I G. 3

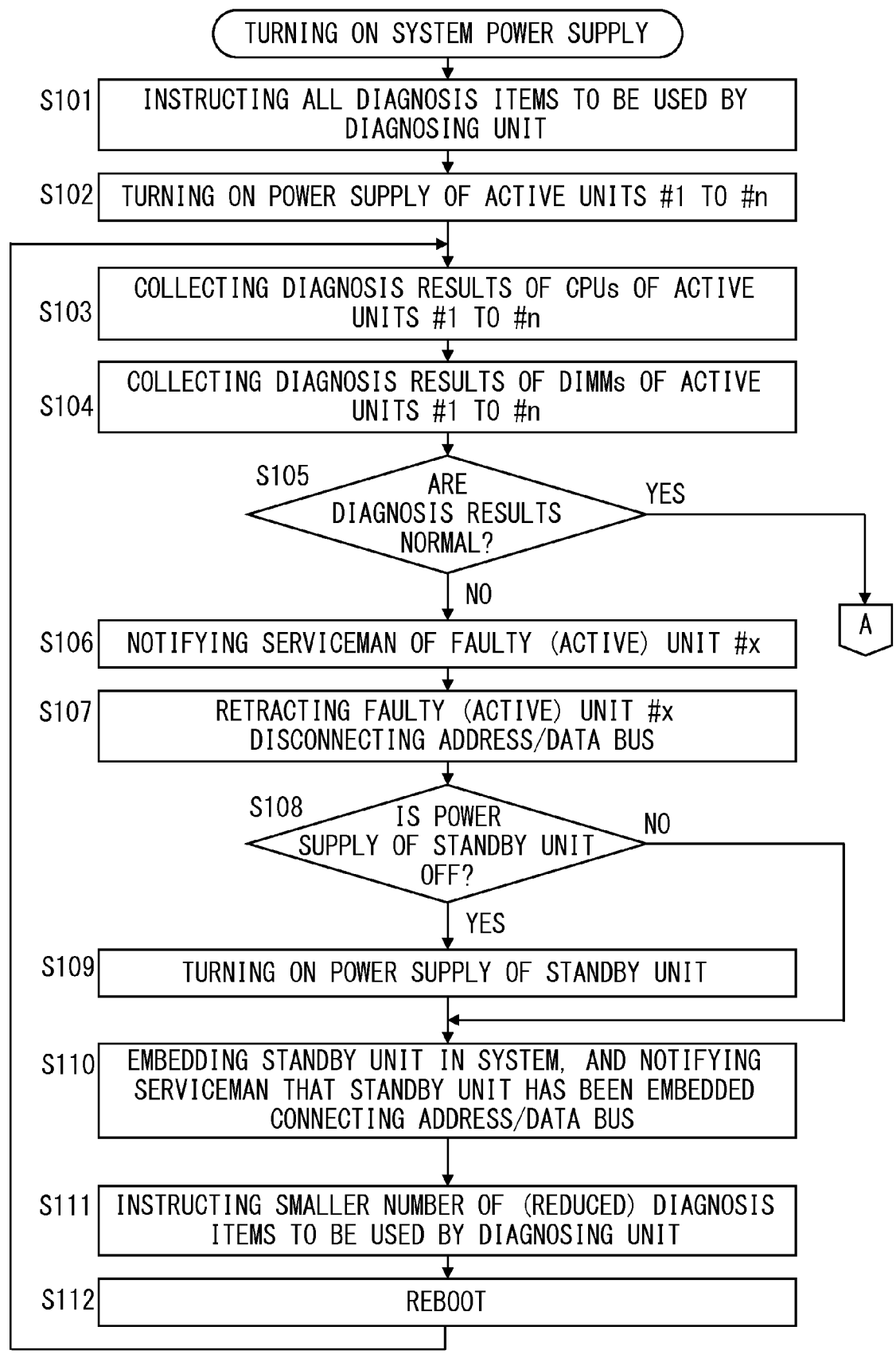
F I G. 5

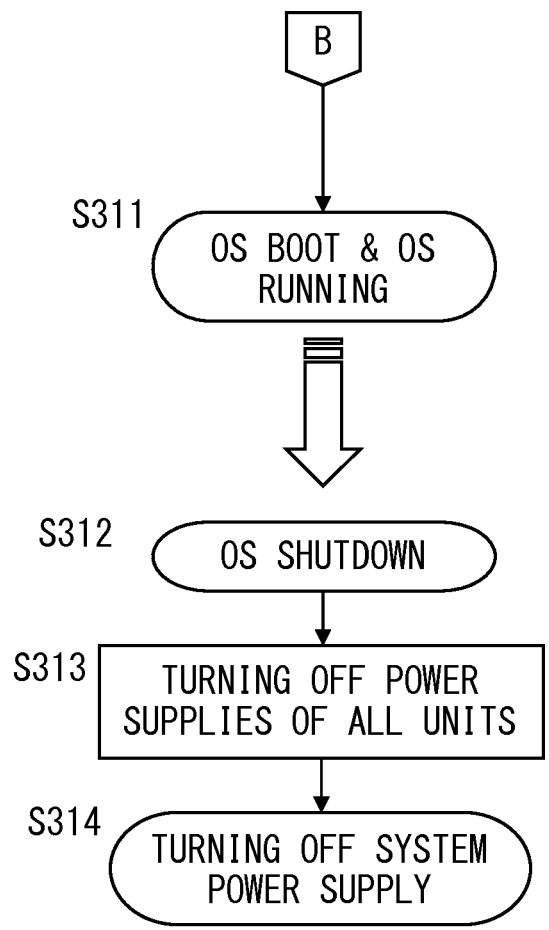
F I G. 9

US 8,555,110 B2

APPARATUS, METHOD, AND PROGRAM CONFIGURED TO EMBED A STANDBY UNIT BASED ON AN ABNORMALITY OF AN ACTIVE UNIT

CROSS-REFERENCE TO RELATED APPLICATION

This application is a continuation application of International PCT application No. PCT/JP2008/071514 which was filed on Nov. 27, 2008.

FIELD

An embodiment of the present invention relates to an information processing apparatus, processing unit switching method and a storage medium storing processing unit switching program.

BACKGROUND

In recent years, an implementation of a RAS (Reliability, Availability and Serviceability) technique, namely, higher reliability, availability and serviceability has been demanded in an information processing apparatus used in a server system, especially, a core server system or the like.

Normally, in an information processing apparatus/information processing system, (hardware) units such as system boards each including a CPU (Central Processing Unit) and a DIMM (Dual Inline Memory Module) are made redundant to give availability by being provided with a standby unit having an equivalent function at a ratio of n to 1. FIG. 11 illustrates a configuration example of a normally redundant information processing system.

In the configuration of FIG. 11, when turning on a power supply of an information processing apparatus, all power supplies of active units 9(#1 to #n) performing a system operation are turned on according to a control of a power supply controlling unit 91 of a system controlling device 90. Here, "active" indicates that a system operation is being performed, and an "active unit" indicates a unit that is performing a system operation.

All CPUs and all DIMMs within the active units 9#1 to 9#n are diagnosed respectively by diagnosing units of the active units. As a result, upon detection of a fault such as a CPU malfunction, a DIMM write/read error or the like of any of the CPUs and/or the DIMMs of the active units 9, a corresponding active unit 9(#1) is retracted after information about the fault of the active unit 9 (#1) from which the fault has been detected is notified to a serviceman, and a standby unit 9' is thereafter embedded. Then, the remaining active units 9(#2 to #n) having no fault, and the embedded standby unit 9' are rebooted. As a result, the redundant function is implemented.

Here, as illustrated in FIG. 13, if the embedded standby unit 9' already has a fault due to some cause such as a malfunction of any of the CPUs or the DIMMs or the like, the following situation occurs.

The remaining active units 9(#2 to #n) having no fault, and the standby unit 9' are rebooted altogether after the standby unit 9' has been embedded, and all the CPUs and all the DIMMs of all the units (9#2 to 9#n and 9') are diagnosed. As a result of this diagnosis, the fault of the CPU or the DIMM of the embedded standby unit 9' is again detected.

If a standby unit 9' including CPUs and DIMMs already has a fault when being embedded as a replacement for the faulty active unit 9(#1) by adopting the redundant configuration, availability of the system is inhibited because the redundant function cannot be implemented by embedding of the standby unit 9'.

To overcome this problem, the standby unit 9' is diagnosed in advance before being embedded.

Patent Document 1: Japanese Laid-open Patent Publication No. 2006-277210
Patent Document 2: Japanese Laid-open Patent Publication No. 5-303509
Patent Document 3: Japanese Laid-open Patent Publication No. 8-87426
Patent Document 4: Japanese Laid-open Patent Publication No. 9-160682

Conventionally, in an information processing apparatus/information processing system having a redundant configuration, remaining active units having no fault and a standby unit are rebooted altogether after the standby unit is embedded, and all CPUs and all DIMMs within all the units are diagnosed.

Accordingly, if a CPU and/or a DIMM of the standby unit has a fault, it is detected after the standby unit is embedded. As a result, the redundant function cannot be implemented.

Additionally, if a redundant standby unit is diagnosed in advance, it cannot be embedded when a fault occurs in a CPU and/or a DIMM of an active unit while the standby unit is being diagnosed. Therefore, the system cannot be relieved by switching to the standby unit.

SUMMARY

The information processing apparatus disclosed herein includes, in order to process information with a system operation, active units configured to continue the system operation, a standby unit standing by for the system operation, and a system controlling device connected to the active units and the standby unit.

Each of the active units includes, as a plurality of logically partitioned processing units, a first processing unit having a first storing device and a first processor configured to perform a computation for information held by the first storing device, and a second processing unit having a second storing device and a second processor configured to perform a computation for information held by the second storing device. Each of the active units further includes a first diagnosing unit configured to diagnose the first and the second processors and the first and the second storing devices, and a first state holding unit configured to hold diagnosis results of the first diagnosing unit.

The standby unit includes, as a plurality of logically partitioned processing units, a third processing unit having a third storing device and a third processor configured to perform a computation for information held by the third storing device, and a fourth processing unit having a fourth storing device and a fourth processor configured to perform a computation for information held by the fourth storing device. The standby unit further includes a second diagnosing unit configured to diagnose the third and the fourth processors and the third and the fourth storing devices, and a second state holding unit configured to hold diagnosis results of the second diagnosing unit.

The system controlling device includes a switching unit configured to embed the standby unit in the information processing apparatus by switching among the first to the fourth processing units, a state monitoring unit configured to monitor the diagnosis results of the active unit, which are held in the first state holding unit, and the diagnosis results of the standby unit, which are held in the second state holding unit, and a switching controlling unit configured to continue the system operation by controlling the switching unit to switch the first or the second processing unit, from which an abnormality has been detected, to the third or the fourth processing unit if the state monitoring unit has detected the abnormality in the diagnosis results of the first or the second processing unit.

In the disclosed apparatus, in each of the active units, the first diagnosing unit respectively diagnoses the first and the second processors and the first and the second storing devices, and stores diagnosis results in the first state holding unit. In the standby unit, the second diagnosing unit respectively diagnoses the third and the fourth processors and the third and the fourth storing devices, and stores diagnosis results in the second state holding unit.

The state monitoring unit of the system controlling device monitors the diagnosis results of the first and the second state holding units. If the state monitoring unit detects an abnormality in the first or the second processing unit in the active unit, the switching controlling unit controls the switching unit to switch the active unit to the standby unit by executing a process for disconnecting the faulty active unit, and a process for embedding a standby unit from which an abnormality has not been detected.

In the standby unit, the second diagnosing unit sequentially diagnoses the plurality of processing units.

Therefore, even if either of the processing units is being diagnosed, unit switching can be made with the other processing unit not being diagnosed. As a result, the system operation can be continued and the information processing apparatus can be relieved.

With the disclosed apparatus, by configuring processing units as logically partitioned units respectively in active units and a standby unit, the standby unit is periodically diagnosed in logically partitioned units such as partitions or the like at normal time. Even if either of the logically partitioned processing units is being diagnosed when a fault occurs in an active unit, the other processing unit can be embedded. As a result, the information processing apparatus can be relieved.

Additionally, a diagnosis can be performed in logically partitioned units such as partitions or the like in advance in the standby unit. Therefore, the length of each diagnosis time can be shortened according to a ratio of the logically partitioned units in comparison with a diagnosis performed in units of physical standby units. For example, if the standby unit is logically divided into two partitions, the length of each diagnosis time can be shortened to approximately one half.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 3 illustrates an example of diagnosis items held in a scheduling unit;

FIG. 5 is a flowchart (No. 1) illustrating a diagnosis process for active units when power supplies are turned off;

FIG. 9 is a flowchart (No. 2) illustrating the diagnosis process for the active units when the power supplies are not turned off;

DESCRIPTION OF EMBODIMENTS

A principle of an information processing apparatus disclosed as an embodiment according to the present invention is described with reference to FIGS. 1 and 2.

Figure 1:
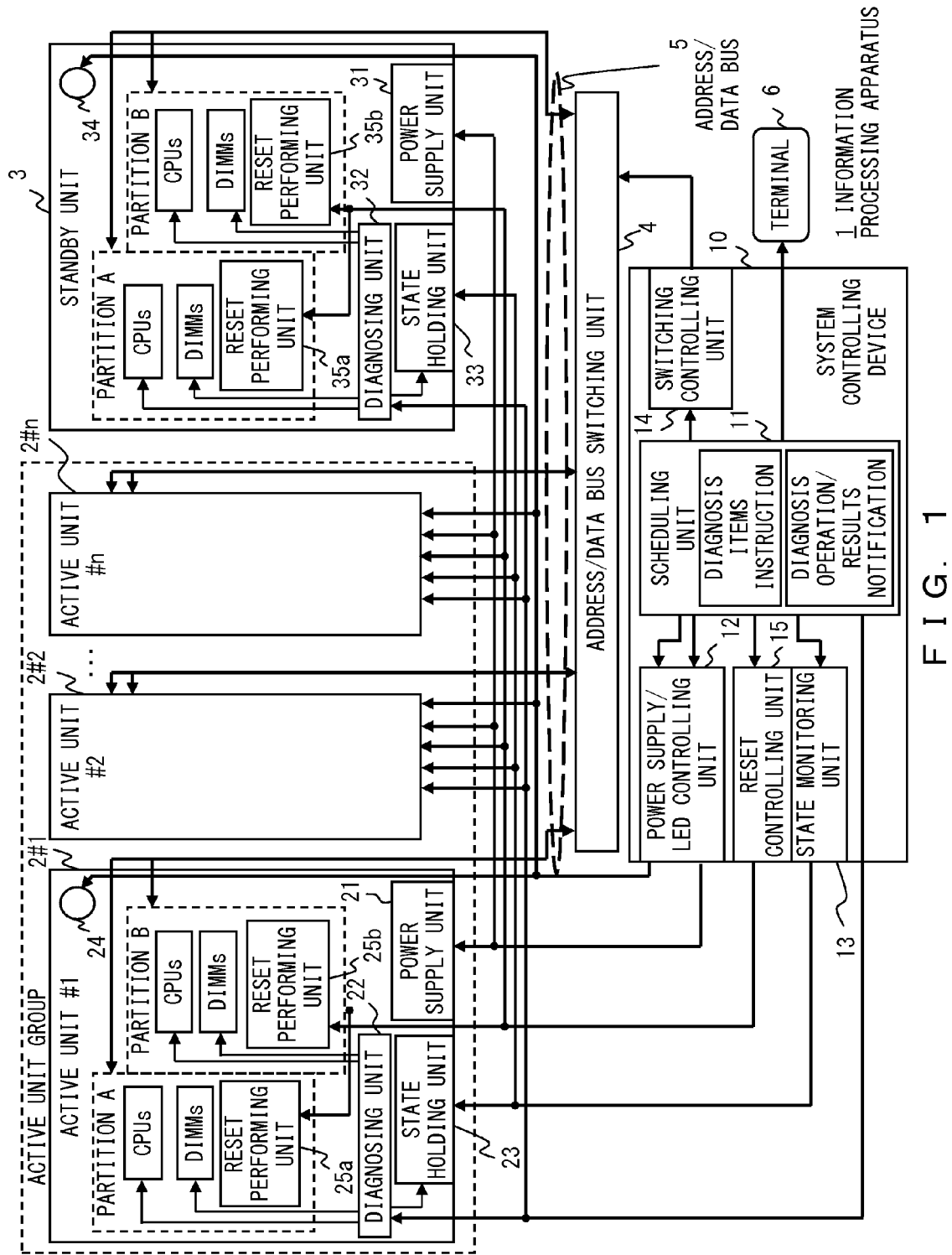
FIG. 1 illustrates a configuration example of an information processing apparatus according to an embodiment.

FIG. 1 illustrates a configuration example of the information processing apparatus 1 according to the embodiment.

The information processing apparatus 1 includes a plurality of active units 2(#1 to #n), a standby unit 3, an address/data bus switching unit 4 and a system controlling device 10.

The active units 2(#1 to #n) are physical units that are active units performing a system operation and respectively include one or a plurality of CPUs and DIMMs.

The standby unit 3 is a physical unit on cold standby including CPUs and DIMMs.

The address/data bus switching unit 4 switches an address/data bus 5 among the active units 2#1 to 2#n and the standby unit 3, namely, retracts a faulty active unit 2 (#x) and embeds the standby unit 3 according to a control of the system controlling device 10.

The system controlling device 10 controls ON/OFF of power supplies of the active units 2#1 to 2#n and the standby unit 3, controls a diagnosis operation notification while the power supplies are ON, instructs diagnosis items to be used in a diagnosis of the CPUs and the DIMMs of the active units 2#1 to 2#n and the standby unit 3, collects state information of the CPUs and the DIMMs of the active units 2#1 to 2#n and the standby unit 3, controls switching of the address/data bus 5 among the active units 2#1 to 2#n and the standby unit 3, and externally notifies diagnosis results.

The active units 2 (2#1, 2#2, , 2#n) and the standby unit 3 of the information processing apparatus 1 respectively include logically partitioned processing units (hereinafter referred to as partitions A and B). With the diagnoses of the active units 2 (2#1, 2#2, , 2#n) and the standby unit 3, the partitions A and B, the processing units in logically partitioned units, are diagnosed in turn.

Figure 2:
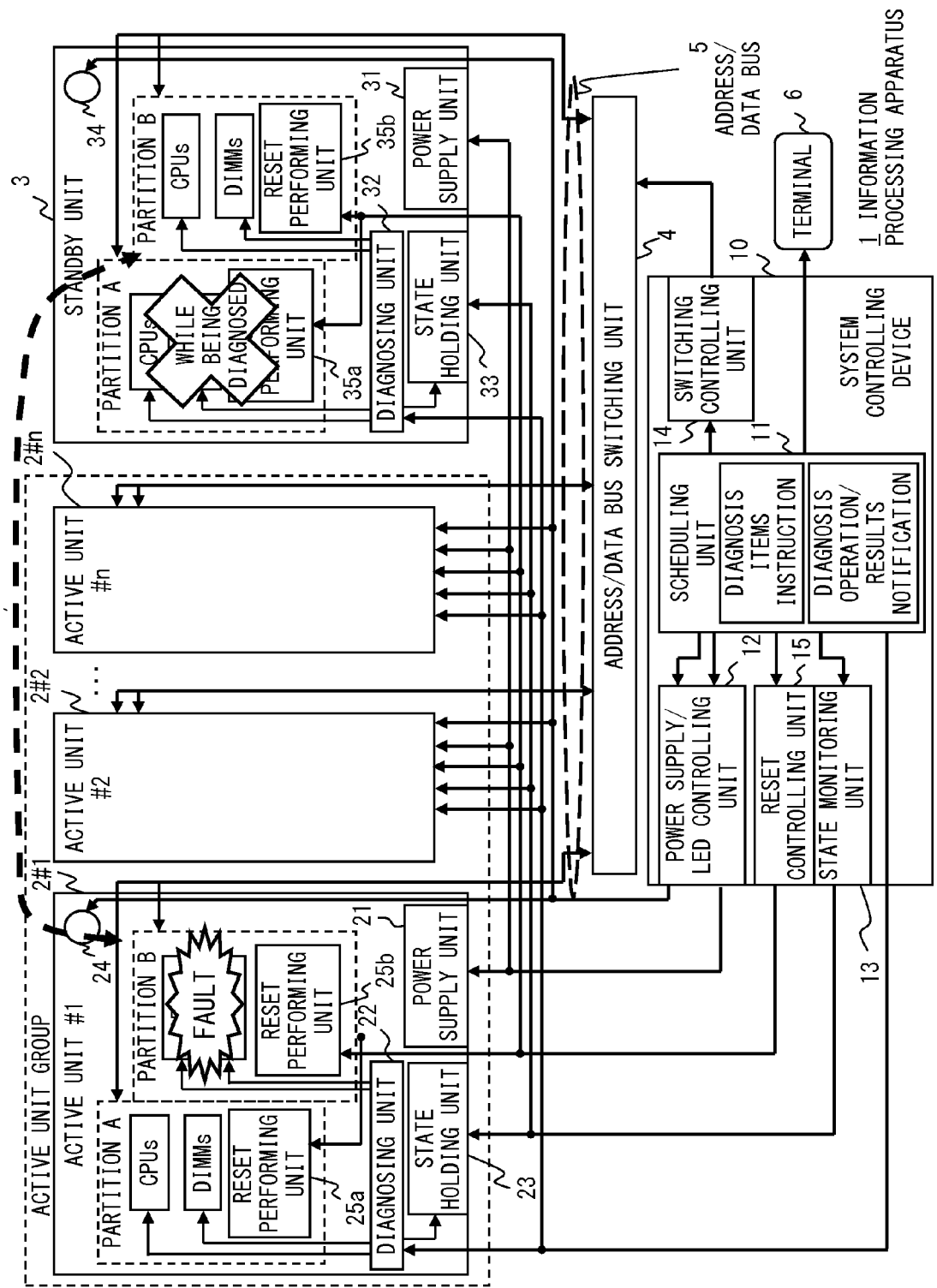
FIG. 2 is an explanatory view of a principle of the information processing apparatus according to the embodiment.

As illustrated in FIG. 2, if a fault occurs in the partition B of the active unit 2#1 while the partition A, one partition side of the standby unit 3, is being diagnosed, the other partition B that is not being diagnosed in the standby unit 3 can be switched. Therefore, the standby unit 3 can be embedded in the system, whereby the information processing apparatus 1 can be relieved.

The system controlling device 10 of the information processing apparatus 1 has a scheduling function.

With this scheduling function, the system controlling device 10 periodically turns on/off the power supply of the standby unit 3 included in the information processing apparatus 1 before being embedded in the system.

In the standby unit 3, the CPUs and the DIMMs in the respective partitions are periodically diagnosed for each of the partitions (partition A or B), and the unit power supply is turned off after being diagnosed.

Additionally, the scheduling function includes a function of instructing and switching between diagnosis items used in a diagnosis performed at normal boot of the active units 2 or in a diagnosis (normal diagnosis) of the standby unit 3, which is performed while the information processing apparatus 1 is normally operating, and diagnosis items used in a diagnosis (diagnosis at embedding) performed at reboot after the standby unit 3 is embedded due to a fault occurrence in an active unit 2.

The system controlling device 10 instructs, for example, all the predetermined diagnosis items to be used in the normal diagnosis, or instructs a smaller number of diagnosis items, which are obtained by reducing predetermined items from all the items, to be used in the diagnosis at embedding performed when a fault occurs.

As a result, the length of diagnosis time needed when the information processing apparatus 1 is rebooted after the standby unit 3 is embedded when a fault occurs in an active unit 2, whereby the length of time needed until the information processing apparatus 1 is restored can be shortened.

The system controlling device 10 also has a function of controlling a diagnosis operation notification for externally notifying that the standby unit 3 is being diagnosed. For example, a diagnosis operation notifying unit such as an LED or the like is provided and lighted up on a front surface of the standby unit 3 while the standby unit 3 is being diagnosed (while the power supply is ON). By externally notifying that either of the processing units (partition A or B) of the standby unit 3 is being diagnosed, a serviceman can be cautioned against accidentally unplugging the standby unit 3 while the standby unit 3 is being diagnosed.

The system controlling device 10 also has a function of notifying a terminal device used by the serviceman of the information processing apparatus 1 of the start/end of a diagnosis, diagnosis results and the like.

With this function, the serviceman can not only verify a diagnosis operation of the standby unit 3 but immediately learn diagnosis results.

As described above, the information processing apparatus 1 can avoid a system fault caused by a trouble of a standby unit 3 embedded as a replacement for a faulty active unit 2, and can be quickly restored from the fault. This can produce an effect of improving reliability and availability in a redundant configuration.

A configuration and process operations of the information processing apparatus 1 according to the embodiment are described in further detail below.

The active units 2 (2#1 to 2#n) of the information processing apparatus 1 illustrated in FIG. 1 respectively include the plurality of logically partitioned processing units (partitions A and B), a power supply unit 21, a diagnosing unit 22, a state holding unit 23 and a diagnosis operation notifying unit 24. The plurality of processing units (partitions A and B) respectively include CPUs, DIMMs, and reset performing units 25a and 25b.

The standby unit 3 is configured similarly to the active units 2. Namely, the standby unit 3 includes a plurality of logically partitioned processing units (partitions A and B), a power supply unit 31, a diagnosing unit 32, a state holding unit 33, and a diagnosis operation notifying unit 34. The plurality of processing units (partitions A and B) respectively include CPUs, DIMMs and reset performing units 35a and 35b.

The power supply units 21 and 31 respectively supply power to the corresponding units according to a control (ON/OFF of the power supply) of the system controlling device 10.

The diagnosing units 22 and 32 respectively diagnose the CPUs and the DIMMs, which are included in the corresponding units.

The state holding units 23 and 33 respectively store the states of the CPUs and the DIMMs, which are included in the corresponding units, as diagnosis results of the diagnosing units 22 and 32. The state holding units 23 and 33 are respectively implemented, for example, with non-volatile memories.

The diagnosis operation notifying units 24 and 34 are lighted up while the power supplies are ON according to a control of the system controlling device 10.

The reset performing units 25 and 35 reboot the processing unit (partition A or B) according to a control of the system controlling device 10.

The system controlling device 10 includes a scheduling unit 11, a power supply/LED controlling unit 12, a state monitoring unit 13, a switching controlling unit 14 and a reset controlling unit 15.

The scheduling unit 11 manages a schedule for periodically diagnosing the CPUs and the DIMMs, which are included in the standby unit 3, after the standby unit 3 is embedded in the information processing apparatus 1.

Additionally, the scheduling unit 11 holds diagnosis items in advance, and instructs diagnosis items to be used in the diagnoses of the active units 2#1 to 2#n and the standby unit 3.

FIG. 3 illustrates an example of diagnosis items held in the scheduling unit 11.

The diagnosis items held in the scheduling unit 11 include a diagnosis target, diagnosis contents and a value indicating an instruction target used in a normal diagnosis/diagnosis at embedding. In FIG. 3, each black circle indicates an instruction target, whereas each dash indicates an instruction non-target.

For the normal diagnosis performed at the normal reboot or the normal diagnosis performed in the standby unit 3 while the active units 2#1 to 2#n are normally operating, all the set diagnosis items are instructed to be used. In contrast, for the diagnosis at embedding performed when the active units and the standby unit 3 are rebooted after the standby unit 3 is embedded due to fault detection of any of the active units 2#1 to 2#n, approximately one third or one half of the total number of set diagnosis items is instructed to be used.

The diagnosis performed by using the same number of diagnosis items as that for the CPUs and the DIMMs of the active units 2#1 to 2#n is not needed at reboot. This is because all the CPUs and all the DIMMs of the embedded standby unit 3 have been already diagnosed in advance with the periodical diagnosis.

By reducing the number of diagnosis items used in the diagnosis performed at reboot in comparison with that used when the system power supply is normally turned on, the length of reboot time can be shortened.

Additionally, the scheduling unit 11 transmits states of the CPUs and the DIMMs, which are collected from the active units 2#1 to 2#n and the standby unit 3 by the state monitoring unit 13, to the terminal 6 such as a terminal of a monitoring system, a terminal used by a serviceman, or the like.

The power supply/LED controlling unit 12 controls ON/OFF of the power supplies of the active units 2#1 to 2#n and the standby unit 3. Moreover, the power supply/LED controlling unit 12 controls light-up, extinguishment, blinking or the like of the diagnosis operation notifying unit 24 of the active units 2#1 to 2#n and the standby unit 3.

The state monitoring unit 13 collects the states of the CPUs and the DIMMs of the active units 2#1 to 2#n and the standby unit 3 from the state holding units 23 and 33 of the respective units.

The switching controlling unit 14 controls the address/data bus switching unit 4 to switch the address/data bus 5 among the active units 2#1 to 2#n and the standby unit 3, and to execute a process for retracting a faulty active unit 2 and a process for embedding the standby unit 3.

The reset controlling unit 15 controls the reset performing units 25 and 35 respectively provided in the partitions of the active units 2#1 to 2#n and the standby unit 3.

The diagnosis process periodically executed for the standby unit 3 is described below.

When the standby unit 3 is embedded in the information processing apparatus 1, the scheduling unit 11 of the system controlling device 10 uses the embedding of the standby unit 3 as a trigger. Thereafter, the scheduling unit 11 instructs the power supply/LED controlling unit 12 to turn on the power supply of the standby unit 3 periodically, for example, every evening. The power supply/LED controlling unit 12 that has received the instruction turns on the power supply unit 31 of the standby unit 3. At this time, the diagnosis operation notifying unit (LED) 34 provided on the front surface of the standby unit 3 is, for example, blinked in orange color. The scheduling unit 11 also notifies the terminal 6 that the standby unit 3 is being diagnosed.

The scheduling unit 11 instructs all the CPUs and all the DIMMs in the partition to be diagnosed to be diagnosed by using all the diagnosis items for the normal diagnosis performed periodically.

In the standby unit 3 the power supply of which is turned on, the diagnosing unit 32 diagnoses all the items regarding a fault (such as a CPU malfunction, a DIMM write/read error, or the like) for all the CPUs and all the DIMMs, which are included in the partition (such as the partition B) to be diagnosed, and stores diagnosis results in the state holding unit 33.

The state monitoring unit 13 of the system controlling device 10 collects the diagnosis results of the state holding unit 33. After the state monitoring unit 13 collects the diagnosis results, the power supply/LED controlling unit 12 instructs the power supply to be turned off, so that the power supply unit 31 of the standby unit 3 is turned off.

If any of the CPUs and/or the DIMMs in the partition B to be diagnosed in the standby unit 3 is faulty as a result of the information collected by the information monitoring unit 13, the power supply/LED controlling unit 12 causes the diagnosis operation notifying unit 34 provided on the front surface of the standby unit 3, for example, to light up in red color. Moreover, the scheduling unit 11 also notifies the terminal 6 that the partition B of the standby unit 3 is faulty.

If none of the CPUs and/or the DIMMs in the partition B of the standby unit 3 is faulty, the power supply/LED controlling unit 12 extinguishes the diagnosis operation notifying unit 34 provided on the front surface of the standby unit 3.

When the fault of the embedded standby unit 3 is notified by the diagnosis operation notifying unit 34 or with a notification made to the terminal 6, the serviceman replaces the embedded standby unit 3 with a new standby unit 3'.

Upon termination of diagnosing the partition B of the standby unit 3, the diagnosis process for the other partition A of the standby unit 3 is similarly executed.

Figure 4:
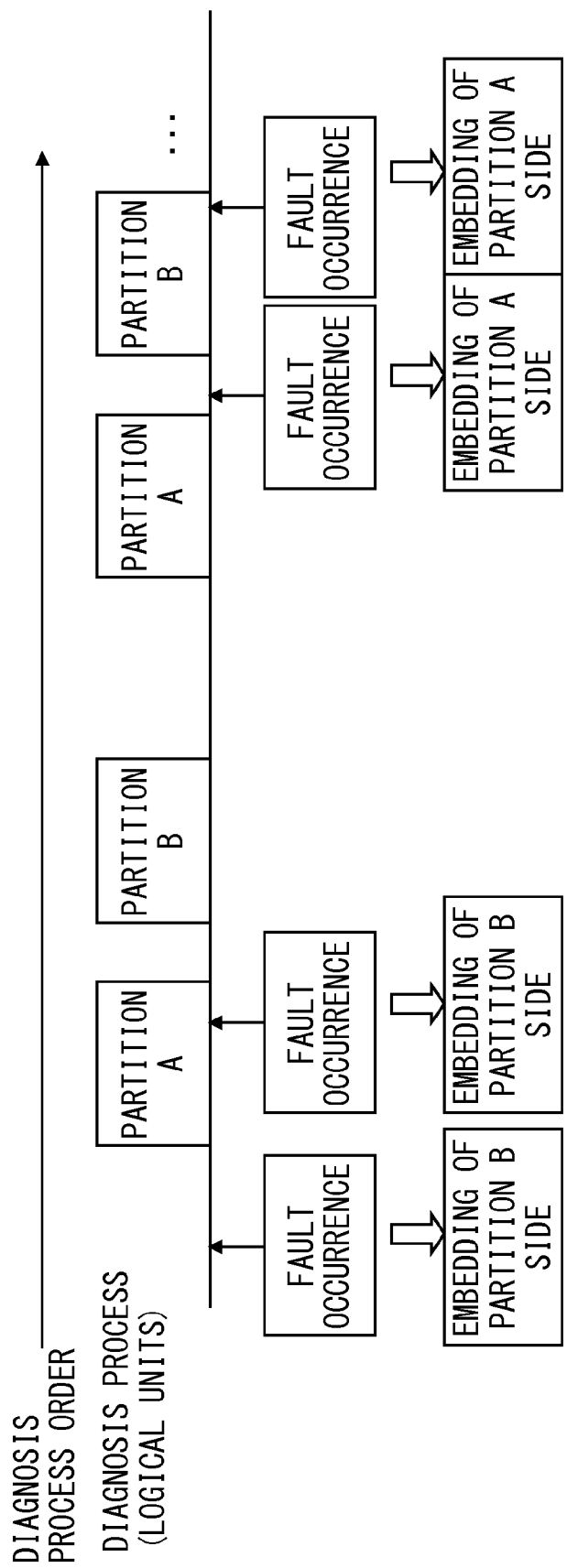
FIG. 4 is an explanatory view of identifying an embedded target according to fault occurrence timing.

Also hereafter, the logically partitioned units (the partitions A and B) of the standby unit 3 are periodically diagnosed in turn. If a fault occurs in any of the active units 2#1 to 2#n when the partitions A and B of the standby unit are scheduled to be diagnosed in turn, for example, in a diagnosis process order illustrated in FIG. 4, a partition to be embedded in the standby unit 3 is determined as follows.

If the fault occurs on the side of the active units 2#1 to 2#n while the power supply of the standby unit 3 is OFF (while the standby unit 3 is not being diagnosed), the scheduling unit 11 notifies the switching controlling unit 14 of the partition B scheduled to be diagnosed later, and the switching controlling unit 14 controls the address/data bus switching unit 4 to make switching for embedding the partition B of the standby unit 3.

Alternatively, if the fault on the side of the active units 2#1 to 2#n occurs while the partition A of the standby unit 3 is being periodically diagnosed, the scheduling unit 11 notifies the switching controlling unit 14 of the partition B not being diagnosed. The switching controlling unit 14 controls the address/data bus switching unit 4 to make switching for embedding the partition B of the standby unit 3.

Still alternatively, if the fault on the side of the active units 2#1 to 2#n occurs after the diagnosis process for the partition A of the standby unit 3 is terminated and if the partition A is normal, the scheduling unit 11 notifies the switching controlling unit 14 of the diagnosed partition A. Then, the switching controlling unit 14 controls the address/data bus switching unit 4 to make switching for embedding the partition A of the standby unit 3.

Still alternatively, if the fault on the side of the active units 2#1 to 2#n occurs while the partition B of the standby unit 3 is being periodically diagnosed, the scheduling unit 11 notifies the switching controlling unit 14 of the partition A not being diagnosed. Then, the switching controlling unit 14 controls the address/data bus switching unit 4 to make switching for embedding the partition A of the standby unit 3.

If diagnosis results of the active units 2#1 to 2#n are abnormal and an abnormality is detected with the normal diagnosis performed by turning on the power supplies of the active units 2#1 to 2#n after the power supply of the information processing apparatus 1 is turned on, either of the partitions (such as the partition A) of the standby unit 3 is embedded as a replacement for an active unit 2#x (x is an integer from 1 to n) from which the fault of the abnormality detection has been detected, and the active units and the standby unit 3 are rebooted.

At this reboot, the scheduling unit 11 instructs a smaller number of diagnosis items than the number of diagnosis items used in the normal diagnosis to be used in the diagnosis at embedding for the active unit group 2#1 to 2#n in which the standby unit 3 is embedded.

Here, ON/OFF of the power supplies of the active units 2#1 to 2#n in the information processing apparatus 1 and ON/OFF of the power supply for the periodical diagnosis process for the respective partitions of the standby unit 3 are asynchronous with each other.

Accordingly, if either of the partitions of the standby unit 3 is used in the active units 2#1 to 2#n, the power supply/LED controlling unit 12 executes any of the following processes.

First case: if the power supplies of the active units 2#1 to 2#n are turned on after the diagnosis of the standby unit 3 is started although the power supplies of the active units 2#1 to 2#n are OFF before the diagnosis is started, the power supplies of the active units 2#1 to 2#n other than the standby unit 3 are turned on. This is because the power supply of the standby unit 3 has already been turned on.

Second case: if the power supplies of the active units 2#1 to 2#n are already ON before the diagnosis of the standby unit 3 is started, the power supply of the standby unit 3 does not need to be turned on when the diagnosis of the standby unit 3 is started. This is because also the power supply of the standby unit 3 is already ON as the active units 2#1 to 2#n.

Third case: if the power supplies of the active units 2#1 to 2#n are turned off due to OS (Operating System) shutdown or the like while the standby unit 3 is being diagnosed, the power supplies of the active units 2#1 to 2#n other than the standby unit 3 are turned off. However, the power supply of the standby unit 3 is withheld from being turned off until the termination of the diagnosis process. Upon termination of the diagnosis process, the power supply of the standby unit 3 is turned off.

Fourth case: if the diagnosis of the standby unit 3 is terminated while the power supplies of the active units 2#1 to 2#n are ON, the power supply of the standby unit 3 is not turned off. The power supply of the standby unit 3 is turned off the same time the power supplies of the active units 2#1 to 2#n are turned off. However, if the power supply of the standby unit 3 is withheld from being turned off as in the third case, the power supply of the standby unit 3 is turned off.

Additionally, in another embodiment, the information processing apparatus 1 executes a process by not turning off the power supplies of the active units 2#1 to 2 #n and the standby unit.

Figure 6:
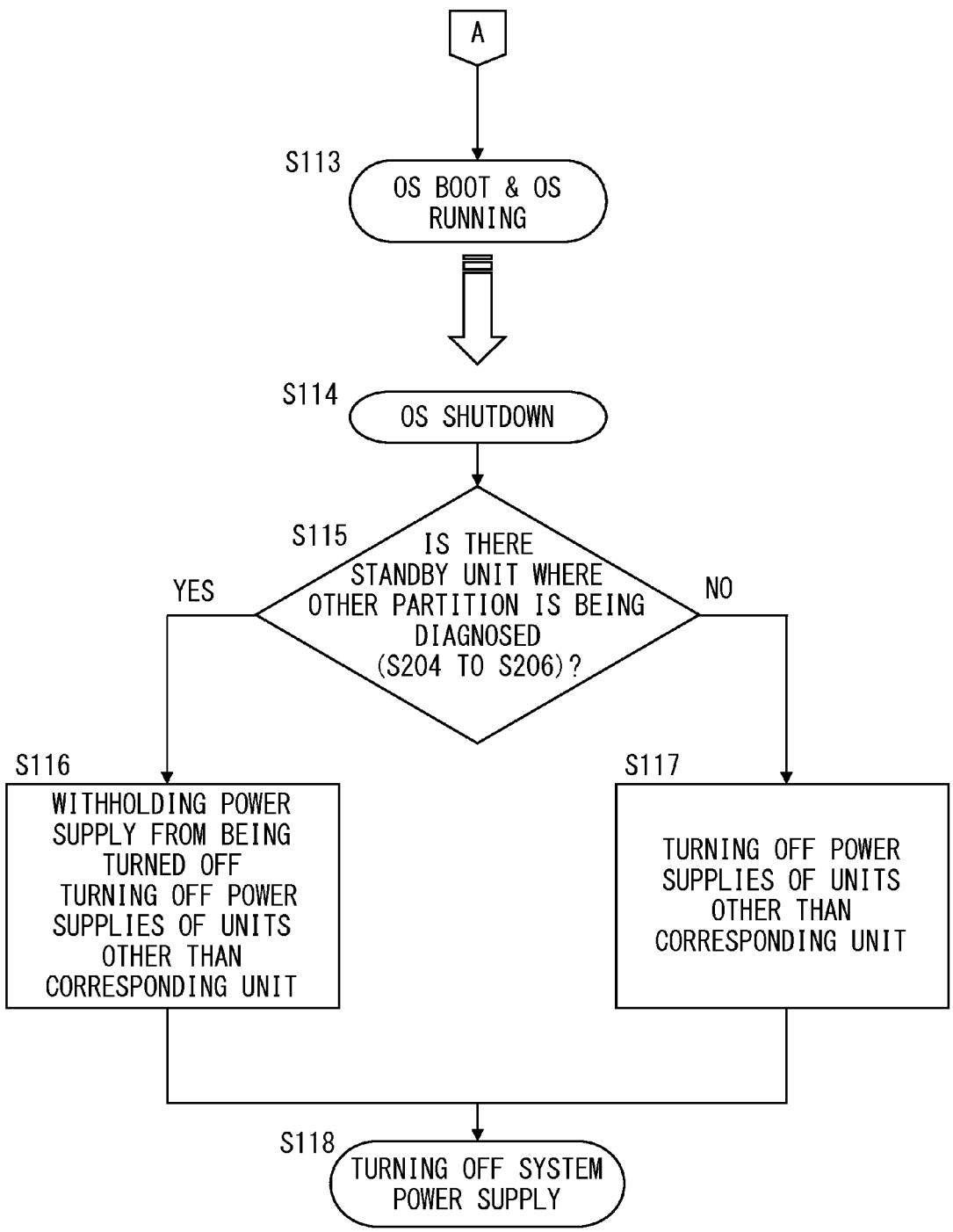
FIG. 6 is a flowchart (No. 2) illustrating the diagnosis process for the active units when the power supplies are turned off.
Figure 7:
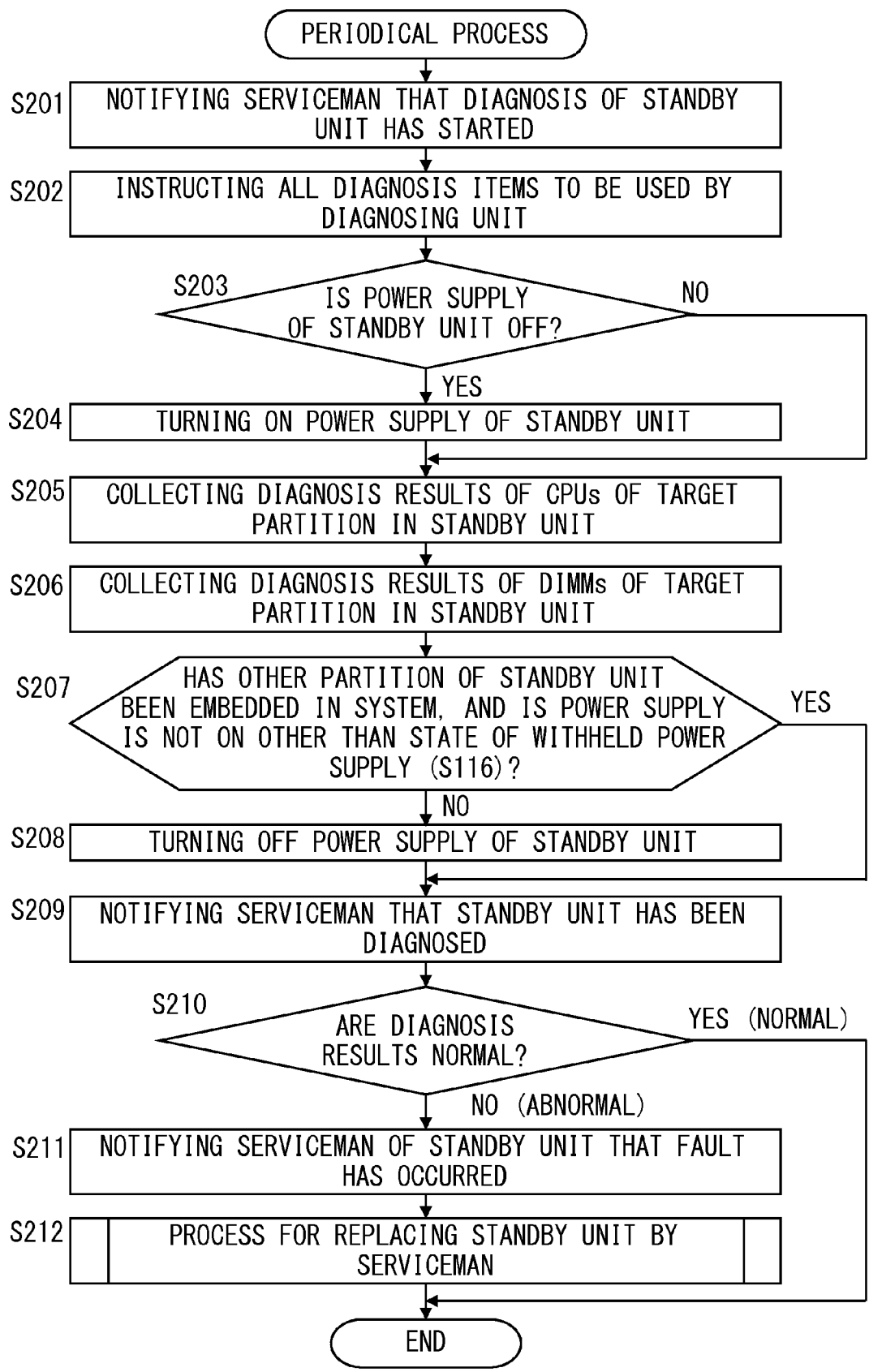
FIG. 7 is a flowchart illustrating a periodical diagnosis process for a standby unit when a power supply is turned off.

FIGS. 5 to 7 are flowcharts illustrating the process executed by the information processing apparatus 1 in the embodiment when the power supplies are turned off.

FIGS. 5 and 6 are flowcharts illustrating the diagnosis process for the active units 2#1 to 2#n when the power supplies are turned off.

This process is started when the power supply of the system controlling device 10 in the information processing apparatus 1 is turned on.

The scheduling unit 11 instructs all the diagnosis items (the normal diagnosis) to be used by units to be diagnosed (step S101). The power supply/LED controlling unit 12 turns on the power supply units 21 of the active units 2#1 to 2#n (step S102).

When the diagnosing unit 22 diagnoses the CPUs and the DIMMs of the active units 2#1 to 2#n to be diagnosed and stores diagnosis results in the state holding unit 23, the state monitoring unit 13 collects the diagnosis results of the CPUs from the respective state holding units 23 of the active units 2#1 to 2#n (step S103), and also collects the diagnosis results of the DIMMs (step S104).

If an abnormality is detected ('NO" in step 5105) when the scheduling unit 11 determines whether or not the diagnosis results are normal (step S105), the abnormality detection is notified to the terminal 6 of the serviceman of a faulty active unit 2#x (x is an integer from 1 to n) (step S106). Moreover, the switching controlling unit 14 instructs the address/data bus switching unit 4 to retract the faulty active unit 2#x (x is an integer from 1 to n), and to disconnect the address/data bus 5 (step S107).

Then, whether or not the power supply of the standby unit 3 is OFF is determined (step S108). If the power supply is OFF ("YES" in step S108), the power supply unit 31 of the standby unit 3 is turned on (step S109).

Then, the switching controlling unit 14 instructs the address/data bus switching unit 4 to embed the standby unit 3, and to connect the address/data bus 5. Moreover, the scheduling unit 11 notifies the serviceman that the standby unit 3 has been embedded (step S110).

The scheduling unit 11 instructs a smaller number of diagnosis items to be used as a diagnosis of the active units 2#1 to 2#n to be diagnosed (step S111), and the reset controlling unit 15 instructs the reset performing units 25 and 35 of the active units 2#1 to 2#n and the embedded standby system 3 to reboot the respective units (step S112).

Then, the flow goes back to the process of step S103, and a diagnosis is performed by using the smaller number of diagnosis items than those of the normal diagnosis by the diagnosing units 22 and 32. Then, diagnosis results are stored in the state holding unit 23 (steps S103 and S104).

If the diagnosis results are normal in the process of step 5105 ("YES" in step S105), OS is booted and made to run as normal process procedures (step S113).

Thereafter, at OS shutdown (step S114), whether or not there is a standby unit 3 where the other partition side is being diagnosed (the processes in steps S204 to S206 of FIG. 7) is determined (step S115). If there is a corresponding standby unit 3 ("YES" in step S115), the power supply/LED controlling unit 12 withholds the power supply of the corresponding standby unit 3 from being turned on, and the power supplies of the units other than the corresponding unit are turned off (step S116). If there is no corresponding standby unit 3 ("NO" in step S115), the power supply/LED controlling unit 12 turns off the power supplies of all the units (step S117).

Thereafter, the power supply of the information processing apparatus 1 is turned off (step S118).

FIG. 7 is a flowchart illustrating the periodical diagnosis process for the standby unit 3 when the power supply is turned off.

By causing the diagnosis operation notifying unit 34 to blink in orange color or by notifying the terminal 6 that the diagnosis has been started, the scheduling unit 11 of the system controlling device 10 notifies the serviceman that the diagnosis of the standby unit 3 has been started (step S201). Moreover, the scheduling unit 11 instructs all the diagnosis items of the CPUs and the DIMMs of the partition (partition A) to be diagnosed to be used (step S202).

If the power supply of the standby unit 3 is OFF ("YES" in step S203) when the power supply/LED controlling unit 12 determines whether or not the power supply is OFF (step S203), the power supply unit 31 of the standby unit 3 is turned on (step S204).

When the diagnosing unit 32 diagnoses the CPUs and the DIMMs in the partition A to be diagnosed and stores diagnosis results in the state holding unit 33, the state monitoring unit 13 collects the diagnosis results of the CPUs from the state holding unit 33 (step S205), and also collects the diagnosis results of the DIMMs (step S206).

If the other partition (partition B) of the standby unit 3 has been embedded in an active unit and the power supply is not ON ("NO" in step 5207) other than the state of withholding the power supply from being turned on (step S116 of FIG. 6), the switching controlling unit 14 turns off the power supply unit 31 of the standby unit 3 (step S208).

The scheduling unit 11 notifies the terminal 6 of the serviceman that the standby unit 3 has been diagnosed (step S209), determines whether or not diagnosis results are normal (step S210), and notifies the terminal 6 of the serviceman of the standby unit 3 that a fault has occurred (step S211) if an abnormality has been detected ("NO" in step S210). As a result, the process for replacing the faulty standby unit 3 is executed by the serviceman (step S212).

If the diagnosis results are normal ("YES" in step S210), the process is terminated.

Figure 8:
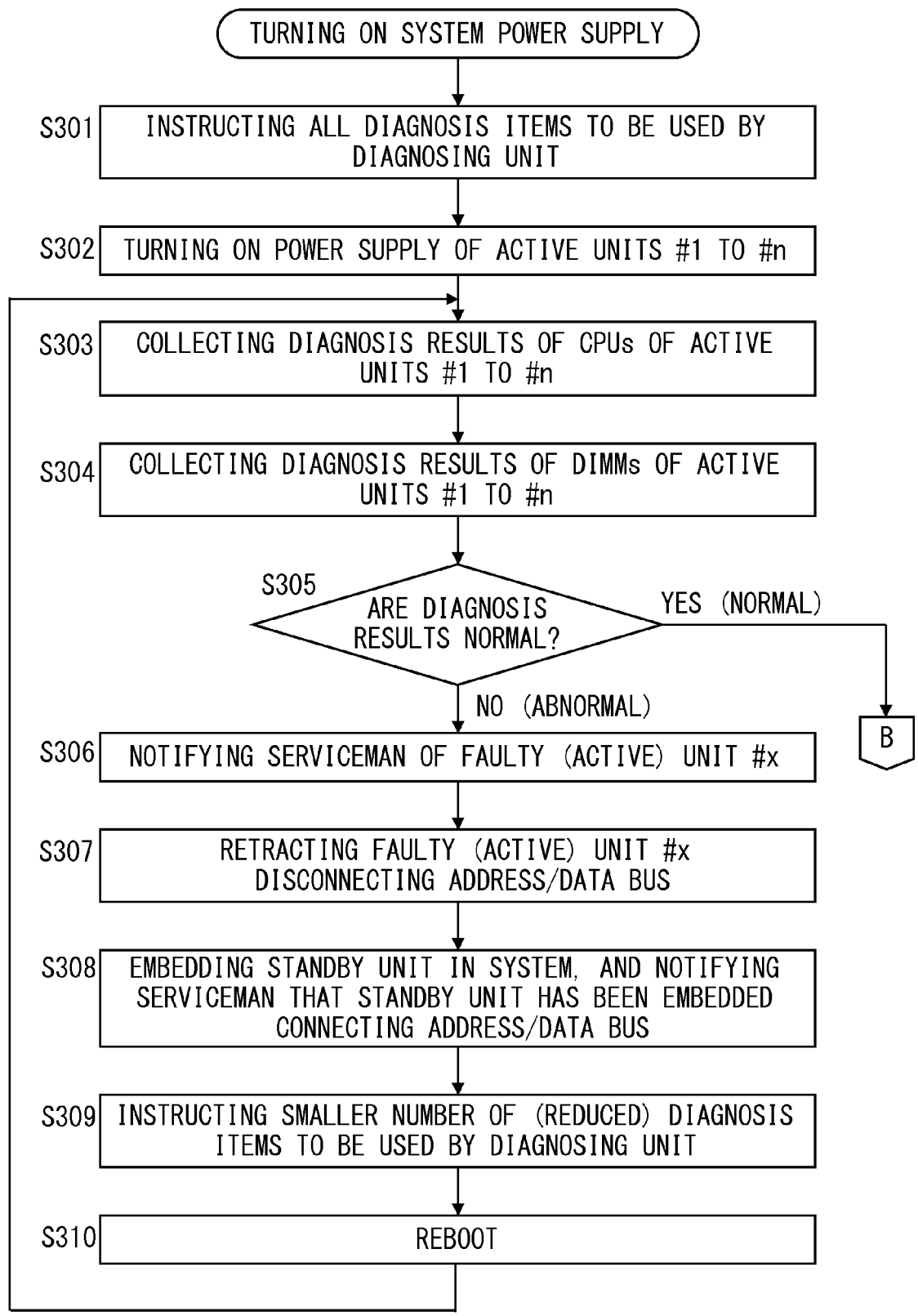
FIG. 8 is a flowchart (No. 1) illustrating a diagnosis process for active units when power supplies are not turned off.
Figure 10:
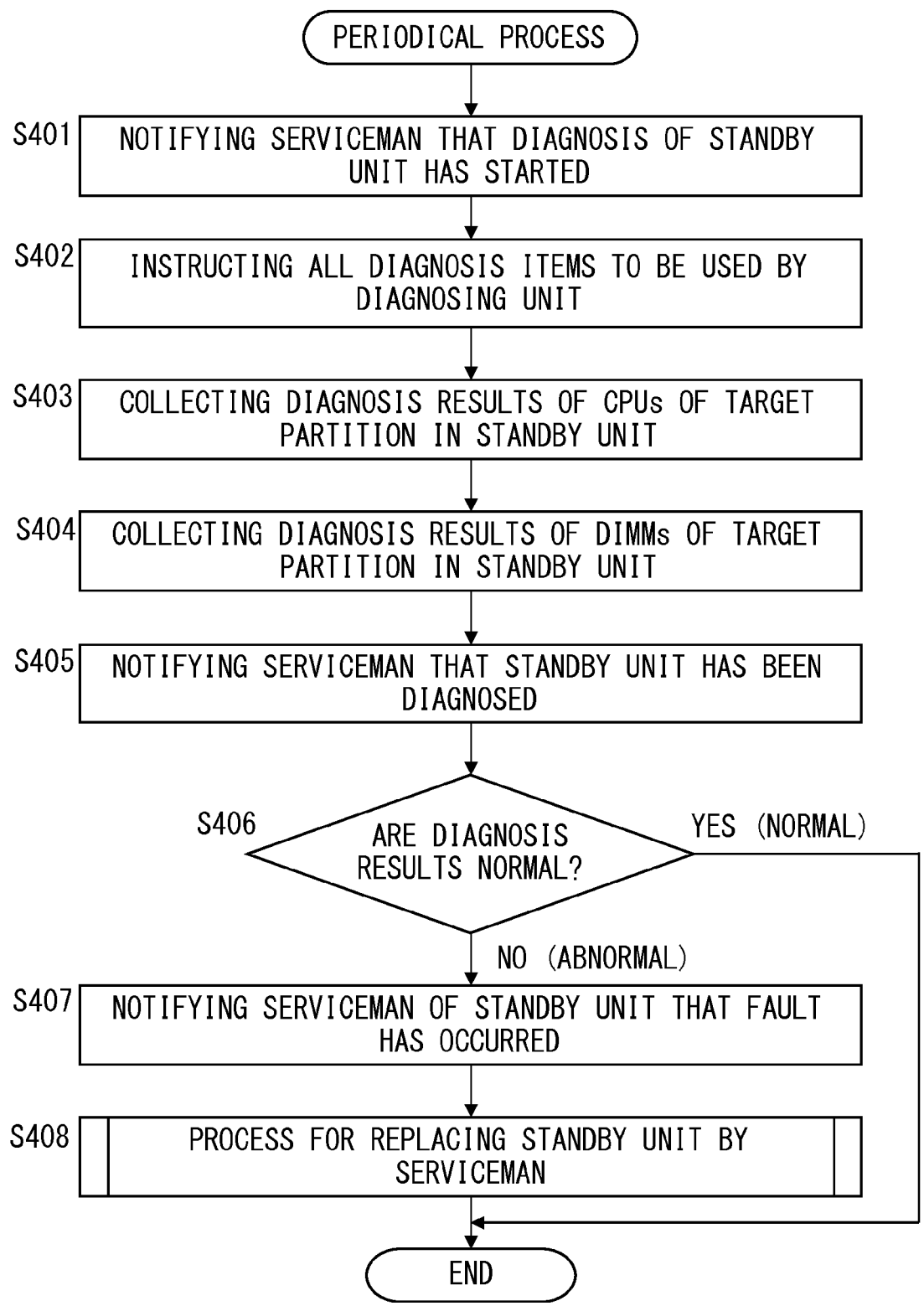
FIG. 10 is a flowchart illustrating a periodical diagnosis process for a standby unit when a power supply is not turned off.
Figure 11:
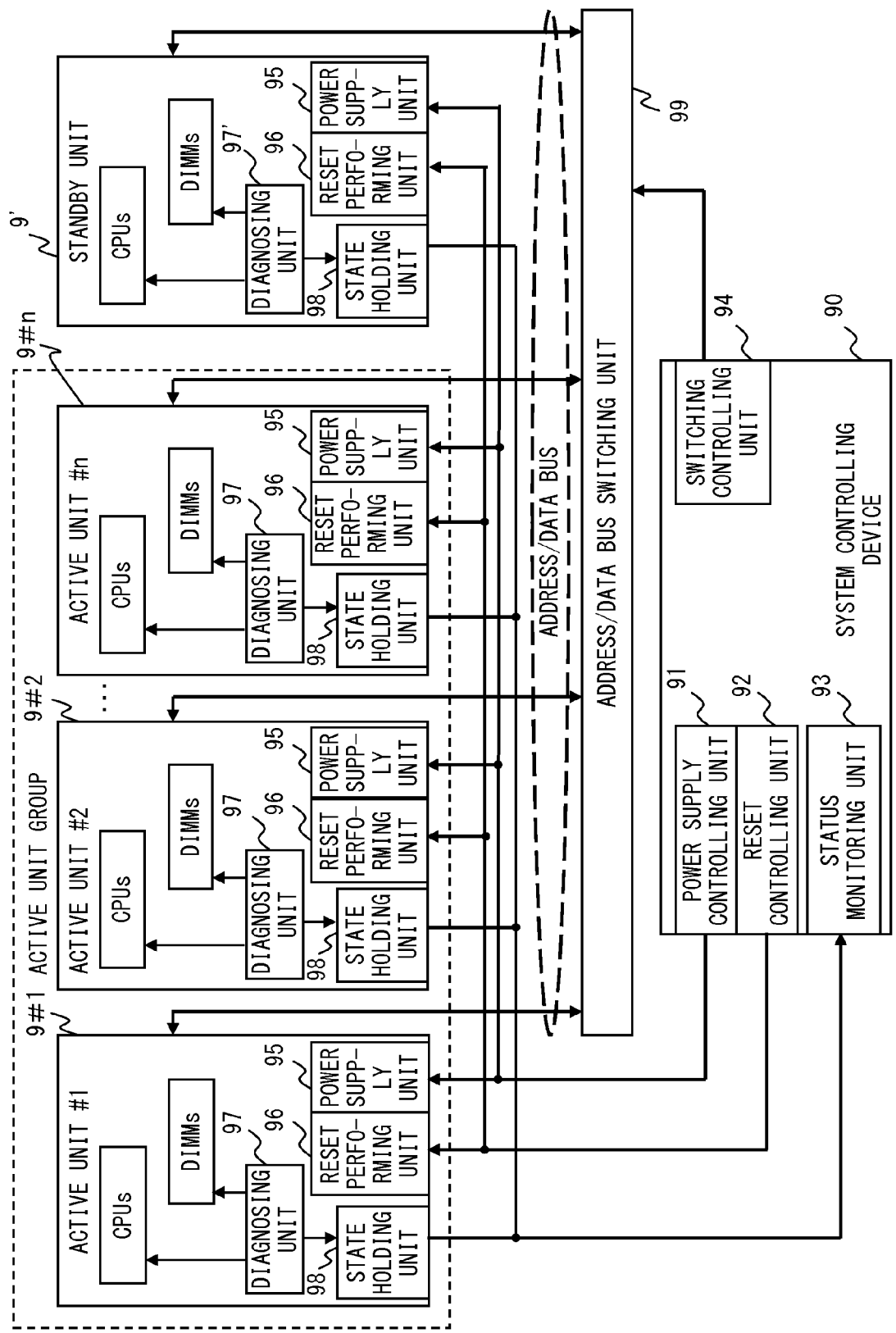
FIG. 11 illustrates a configuration example of a normally redundant information processing system.
Figure 12:
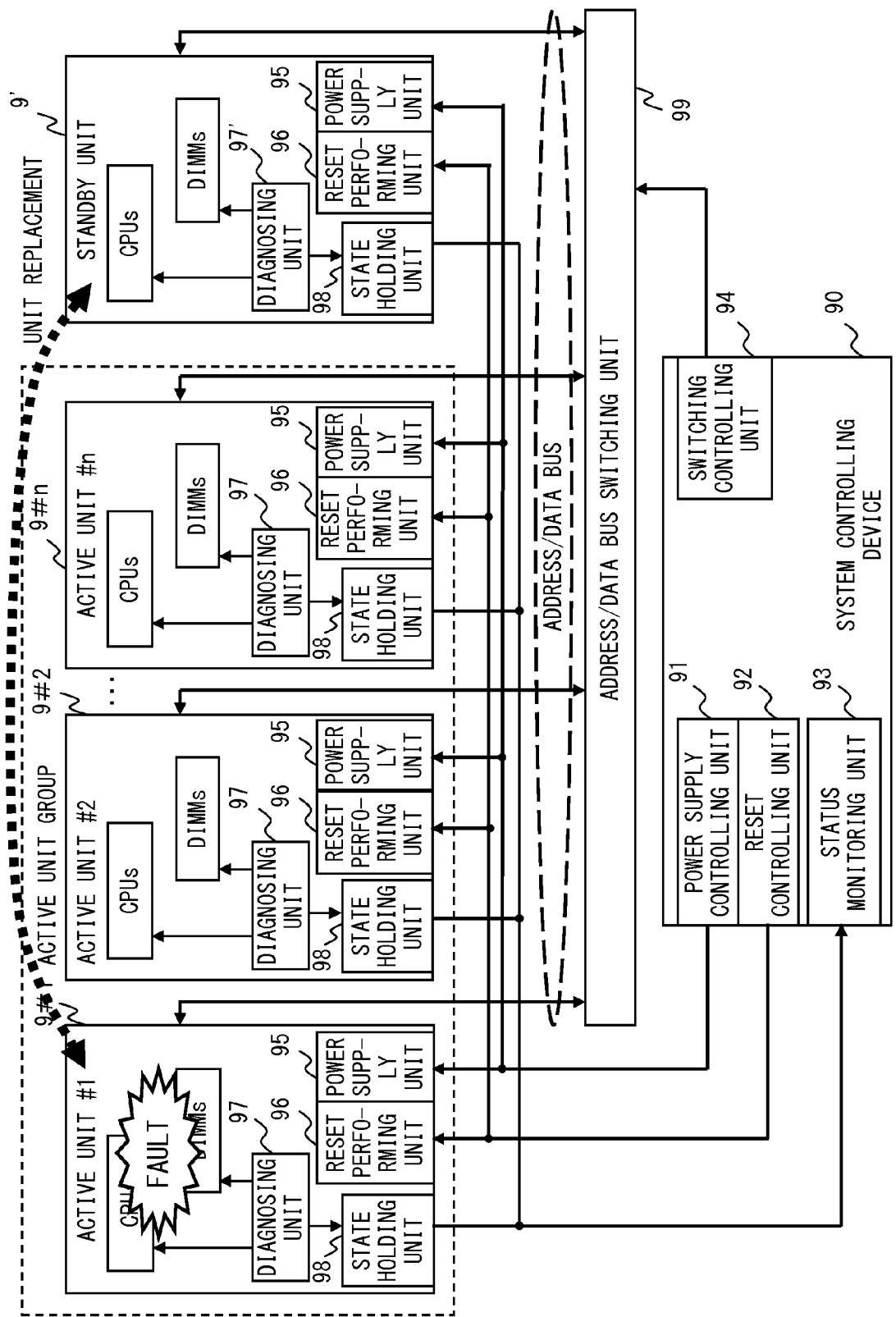
FIG. 12 is an explanatory view of unit switching of the normally redundant information processing system.
Figure 13:
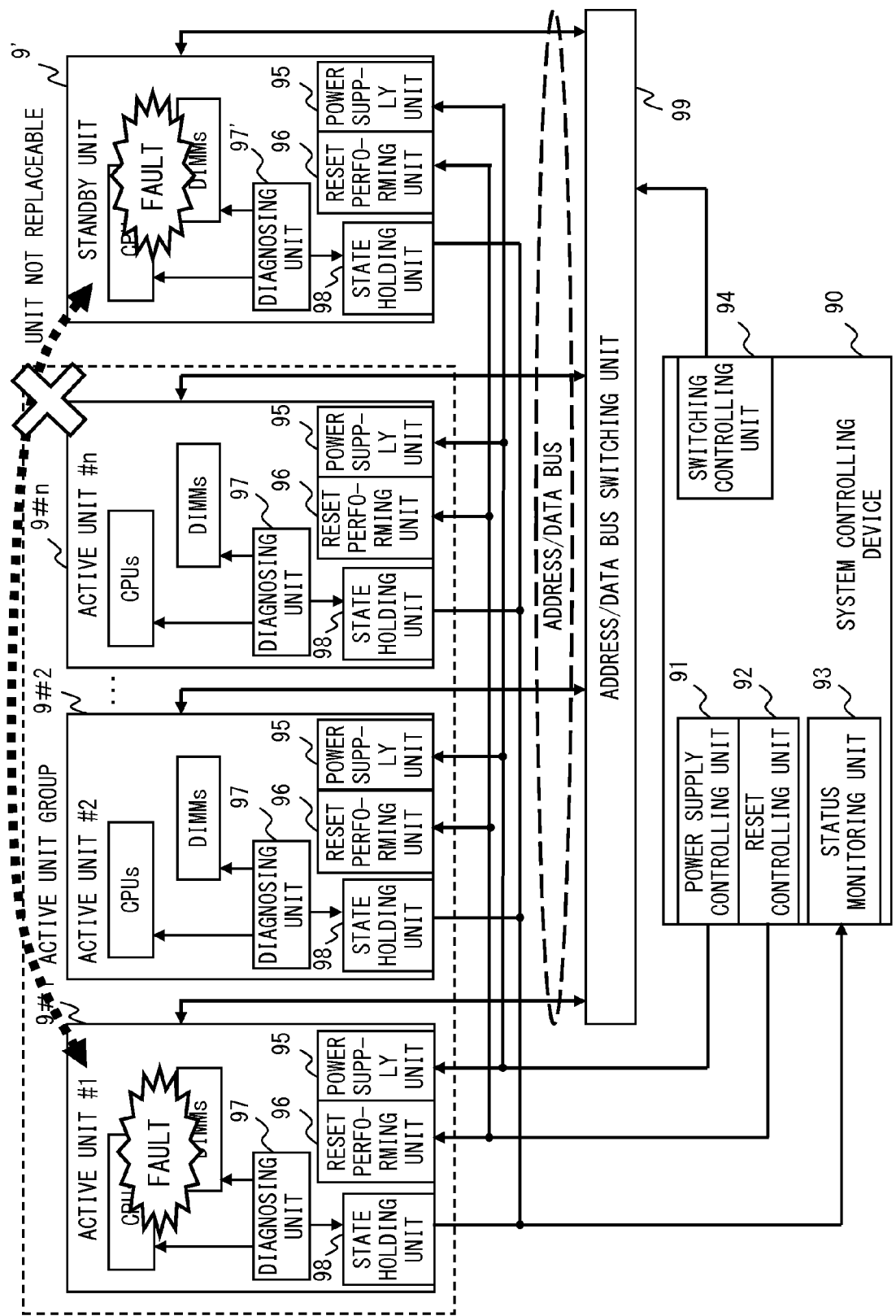
FIG. 13 is an explanatory view of unit switching of the normally redundant information processing system.

FIGS. 8 to 10 are flowcharts illustrating the process executed by the information processing apparatus 1 in another embodiment when the power supplies are not turned off.

FIGS. 8 and 9 are flowcharts illustrating the diagnosis process for the active units 2#1 to 2#n when the power supplies are not turned off.

The process is started when the power supply of the system controlling device 10 of the information processing apparatus 1 is turned on.

The scheduling unit 11 instructs all the diagnosis items to be used by units to be diagnosed (step S301). The power supply/LED controlling unit 12 turns on the power supply units 21 of the active units 2#1 to 2#n (step S302).

After the diagnosing unit 22 diagnoses the CPUs and the DIMMs of the active units 2#1 to 2#n to be diagnosed and stores diagnosis results in the state holding unit 23, the state monitoring unit 13 collects the diagnosis results of the CPUs from the respective state holding units 23 of the active units 2#1 to 2#n (step S303), and also collects the diagnosis results of the DIMMs (step S304).

If the scheduling unit 11 detects an abnormality ("NO" in step S305) when determining whether or not the diagnosis results are normal, the scheduling unit 11 notifies the terminal 6 of the serviceman of the faulty active unit 2#x that the abnormality has been detected (step S306).

Additionally, the switching controlling unit 14 instructs the address/data bus switching unit 4 to retract the faulty active unit 2#x, to disconnect the address/data bus 5 (step S307), to embed the standby unit 3, and to connect the address/data bus 5. Then, the scheduling unit 11 notifies the serviceman that the standby unit 3 has been embedded (step S308).

The scheduling unit 11 instructs a diagnosis using a smaller number of diagnosis items (diagnosis at embedding) to be performed by the active units to be diagnosed (step S309). Then, the reset controlling unit 15 instructs the reset performing units 25 and 35 of the active units 2#1 to 2#n and the standby unit 3 to reboot the respective units (step S310).

As a result, the flow goes back to the process of step S303. Then, the diagnosing units 22 and 23 perform the diagnosis by using the smaller number of diagnosis items than those of the normal diagnosis, and store diagnosis results in the state holding unit 23 (step S303 and S304).

If the diagnosis results are normal in the process of step S305, OS is booted and made to run as normal process procedures (step S311).

Thereafter, at shutdown of the OS (step S312), the power supplies of all the units are turned off (step S313). Then, the power supply of the information processing apparatus 1 is turned off (step S314).

FIG. 10 is a flowchart illustrating the periodical diagnosis process for the standby unit 3 when the power supply is not turned off.

By blinking the diagnosis operation notifying unit 34 in orange or by notifying the terminal 6 that the diagnosis has been started, the scheduling unit 11 of the system controlling device 10 notifies the serviceman that the diagnosis of the standby unit 3 has been started (step S401). Moreover, the scheduling unit 11 instructs all the diagnosis items for the CPUs and the DIMMs of either of the partitions (the partition A) to be diagnosed to be used (step S402).

When the diagnosing unit 32 diagnoses the CPUs and the DIMMs of the partition A to be diagnosed and stores diagnosis results in the state holding unit 33, the state monitoring unit 13 collects the diagnosis results of the CPUs from the state holding unit 33 (step S403), and also collects the diagnosis results of the DIMMs (step S404).

The scheduling unit 11 notifies the terminal 6 of the serviceman that the standby unit 3 has been diagnosed (step S405), determines whether or not the diagnosis results are normal (step S406), and notifies the terminal 6 of the serviceman of the standby unit 3 that a fault has occurred (step S407) if determining that the abnormality has been detected ("NO" in step S406). Then, the process for replacing the faulty standby unit 3 is executed by the serviceman (step S408).

If the diagnosis results are normal ("YES" in step S406), the process is terminated.

The processes executed by the information processing apparatus 1 according to one embodiment and another embodiment have been described above. However, various modifications can be made to the present invention within a scope that does not depart from the gist of the present invention as a matter of course.

The processing units included in the information processing apparatus 1 can be implemented as a program that is read by a computer and installed to execute the particular processes.

This program can be stored onto a suitable computer-readable recording medium such as a portable medium memory, a semiconductor memory, a hard disk and the like. The program is provided by being recorded on these recording media, or provided with a transmission/reception made via a communication interface.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus for processing information by executing a system operation, comprising:
    an active unit that is activated for executing the system operation, and includes first processing units each having a first storing device and a first processor performing a computation, and a first diagnosing unit that is provided commonly for the first processing units and diagnoses the first processing units;
    a standby unit that stands by for executing the system operation, and includes second processing units each having a second storing device and a second processor performing a computation, and a second diagnosing unit that is provided commonly for the second processing units and diagnoses the second processing units; and
    a system controlling device that is connected to the active unit and the standby unit, and includes
        a switching unit configured to embed the standby unit in the information processing apparatus by switching between the first processing units and the second processing units,
        a state monitoring unit configured to monitor the diagnosis of the active unit by the first diagnosing unit, and
        a controlling unit controlling the switching unit to switch a first processing unit in which an abnormality is detected to a second processing unit which is not being diagnosed when the state monitoring unit detects the abnormality in any of the first processing units, wherein the controlling unit controls a schedule of diagnoses performed by the second diagnosing unit, wherein the controlling unit controls the switching unit to switch the first processing unit in which the abnormality is detected to the second processing unit which is not being diagnosed based on the schedule of diagnoses by the second diagnosing unit, wherein the standby unit further comprises a power supply unit that supplies power to the second processing units, and wherein said information processing apparatus further comprises a scheduling unit configured to control a schedule of a power supply by the power supply unit to the second processing units based on the schedule of the diagnoses performed by the second diagnosing unit, and the scheduling unit further comprises a diagnosis item holding unit configured to hold, as diagnosis items used to diagnose the active unit and the standby unit by the first and the second diagnosing units, first diagnosis items which are contents of instructions used for diagnosing the active unit and the standby unit before the standby unit is embedded in the information processing apparatus, and second diagnosis items which are contents of instructions used for diagnosing the active unit and the standby unit after the standby unit is embedded in the information processing apparatus, and the number of the second diagnosis items is smaller than the number of the first diagnosis items.

2. The information processing apparatus according to claim 1, wherein the system controlling device further comprises a diagnosis operation notifying unit that notifies an outside device of the information processing apparatus that the first diagnosing unit is diagnosing the first processing units or the second diagnosing unit is diagnosing the second processing units.

3. A processing unit switching method executed by an information processing apparatus for processing information by executing a system operation, the method comprising:

diagnosing, by a first diagnosing unit that is provided commonly for first processing units, an active unit that is activated for executing the system operation, and includes the first processing units each having a first storing device and a first processor performing a computation;

diagnosing, by a second diagnosing unit that is provided commonly for second processing units, a standby unit that stands by for executing the system operation, and includes the second processing units each having a second storing device and a second processor performing a computation;

monitoring the diagnosis of the active unit;

embedding the standby unit in the information processing apparatus by switching a first processing unit in which an abnormality is detected to a second processing unit which is not being diagnosed when the abnormality in the first processing unit is detected;

controlling a schedule of diagnoses performed by the second diagnosing unit, wherein the controlling of the schedule controls the switching to switch the first processing unit in which the abnormality is detected to the second processing unit which is not being diagnosed based on the schedule of diagnoses by the second diagnosing unit, wherein the standby unit further comprises a power supply unit that supplies power to the second processing units; and controlling a schedule of a power supply by the power supply unit to the second processing units based on the schedule of the diagnoses performed by the second diagnosing unit, wherein the controlling of the schedule of the power supply further comprises holding, as diagnosis items used to diagnose the active unit and the standby unit by the first and the second diagnosing units, first diagnosis items which are contents of instructions used for diagnosing the active unit and the standby unit before the standby unit is embedded in the information processing apparatus, and second diagnosis items which are contents of instructions used for diagnosing the active unit and the standby unit after the standby unit is embedded in the information processing apparatus, and wherein the number of the second diagnosis items is smaller than the number of the first diagnosis items.

4. A non-transitory computer-readable storage medium storing a processing unit switching program for causing an information processing apparatus execute process for processing information by executing a system operation, the process comprising:

diagnosing, by a first diagnosing unit that is provided commonly for first processing units, an active unit that is activated for executing the system operation, and includes the first processing units each having a first storing device and a first processor performing a computation for information held in the first storing device connected to the first processor;

diagnosing, by a second diagnosing unit that is provided commonly for second processing units, a standby unit that stands by for executing the system operation, and includes the second processing units each having a second storing device and a second processor performing a computation for information held in the second storing device connected to the second processor;

monitoring the diagnosis of the active unit;

embedding the standby unit in the information processing apparatus by switching a first processing unit belonging to the active unit from which an abnormality is detected to a second processing unit belonging to the standby unit which is not being diagnosed based on a diagnosis schedule for the second processing units when the monitoring detects the abnormality in the first processing unit;

controlling a schedule of diagnoses performed by the second diagnosing unit, wherein the controlling of the schedule controls the switching to switch the first processing unit in which the abnormality is detected to the second processing unit which is not being diagnosed based on the schedule of diagnoses by the second diagnosing unit, wherein the standby unit further comprises a power supply unit that supplies power to the second processing units; and controlling a schedule of a power supply by the power supply unit to the second processing units based on the schedule of the diagnoses performed by the second diagnosing unit, wherein the controlling of the schedule of the power supply further comprises holding, as diagnosis items used to diagnose the active unit and the standby unit by the first and the second diagnosing units, first diagnosis items which are contents of instructions used for diagnosing the active unit and the standby unit before the standby unit is embedded in the information processing apparatus, and second diagnosis items which are contents of instructions used for diagnosing the active unit and the standby unit after the standby unit is embedded in the information processing apparatus, and wherein the number of the second diagnosis items is smaller than the number of the first diagnosis items.

* * * * *